(12) United States Patent
Rattunde

(10) Patent No.: US 10,293,417 B2
(45) Date of Patent: May 21, 2019

(54) METHOD FOR SAWING A LONG PROFILE AND MACHINE FOR CUTTING SAME TO LENGTH

(71) Applicant: RATTUNDE & CO GMBH, Ludwigslust (DE)

(72) Inventor: Ulrich Rattunde, Bentwisch (DE)

(73) Assignee: Rattunde AG, Ludwigslust (DE)

( * ) Notice: Subject to any disclaimer, the term of this patent is extended or adjusted under 35 U.S.C. 154(b) by 57 days.

(21) Appl. No.: 15/532,241

(22) PCT Filed: Nov. 24, 2015

(86) PCT No.: PCT/EP2015/077471
§ 371 (c)(1),
(2) Date: Jun. 1, 2017

(87) PCT Pub. No.: WO2016/087266
PCT Pub. Date: Jun. 9, 2016

(65) Prior Publication Data
US 2017/0266740 A1    Sep. 21, 2017

(30) Foreign Application Priority Data

Dec. 1, 2014 (DE) .................. 10 2014 117 618

(51) Int. Cl.
| | |
|---|---|
| *B23D 45/18* | (2006.01) |
| *B23D 59/00* | (2006.01) |
| *B23D 21/04* | (2006.01) |
| *B27B 5/32* | (2006.01) |
| *B27B 33/12* | (2006.01) |

(Continued)

(52) U.S. Cl.
CPC ............. *B23D 45/18* (2013.01); *B23D 21/04* (2013.01); *B23D 59/001* (2013.01); *B27B 5/32* (2013.01); *B27B 33/12* (2013.01); *A01D 34/733* (2013.01); *A01G 23/091* (2013.01)

(58) Field of Classification Search
CPC ...... B23D 21/04; B23D 45/18; B23D 59/001; B27B 33/12; B27B 5/32
See application file for complete search history.

(56) References Cited

U.S. PATENT DOCUMENTS

| | | | | |
|---|---|---|---|---|
| 4,977,802 A | * | 12/1990 | Kirbach | B23D 47/005 83/13 |
| 2013/0220096 A1 | * | 8/2013 | Viljanen | B23D 47/00 83/829 |

FOREIGN PATENT DOCUMENTS

| | | |
|---|---|---|
| DE | 4308032 C2 | 9/1994 |
| DE | 69103033 T2 | 12/1994 |

(Continued)

*Primary Examiner* — Stephen Choi
(74) *Attorney, Agent, or Firm* — Bay State IP, LLC

(57) ABSTRACT

The invention relates to a method for sawing a long profile (3) in that a sawing disc (2) having teeth (6) arranged around a circular outer circumference of the sawing disc (2) is rotated freely, the sawing disc (2) is advanced from a freely rotating position to an outer wall of the long profile (3), and a zero tooth ($Z_1$, $Z_2$, $Z_3$, $Z_4$) engages as the first of the teeth (6) in the material of the outer wall, wherein, during the free rotation of the sawing disc (2), lateral runouts (d) of the teeth (6) are determined, and a tooth (6) having a minimum lateral runout (d) is determined and used as the zero tooth ($Z_1$, $Z_2$, $Z_3$, $Z_4$).

8 Claims, 2 Drawing Sheets

Figure 1:
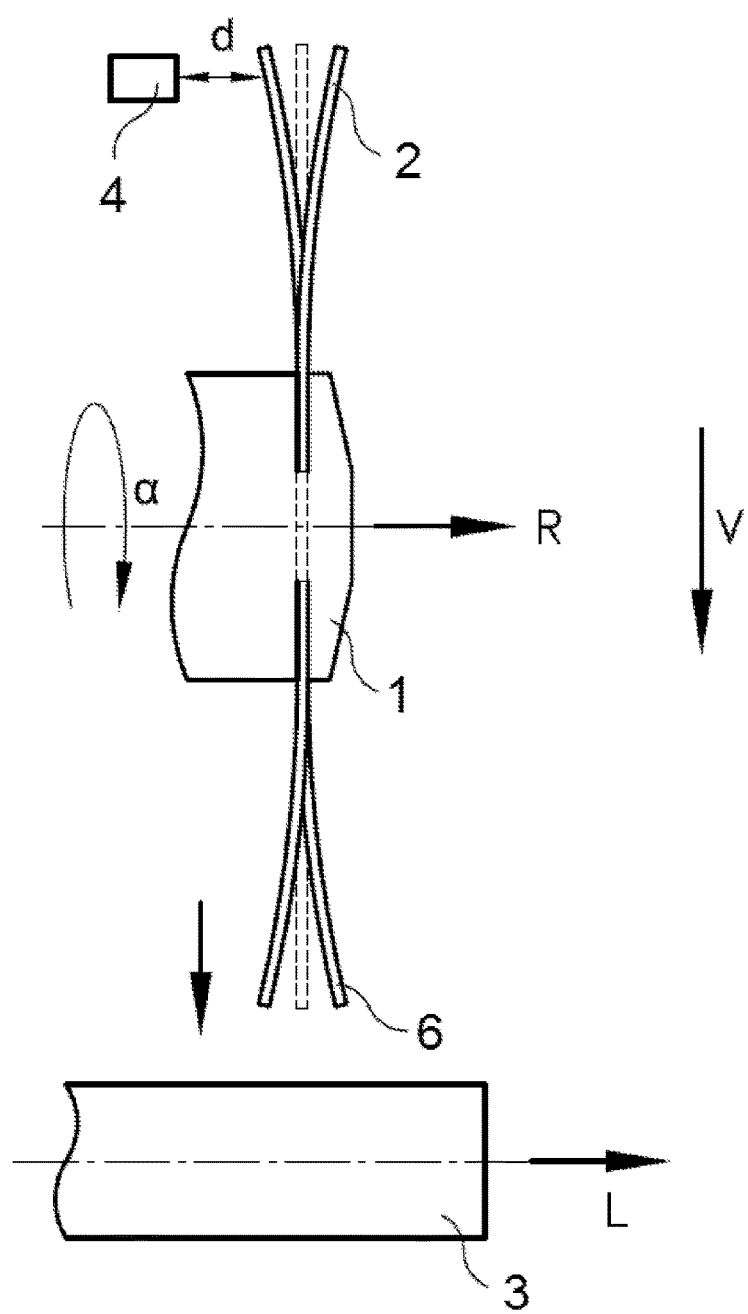

(51) Int. Cl.
*A01D 34/73* (2006.01)
*A01G 23/091* (2006.01)

(56) References Cited

FOREIGN PATENT DOCUMENTS

DE  102006000297 A1  12/2007
WO  2007/014979  2/2007

* cited by examiner

METHOD FOR SAWING A LONG PROFILE AND MACHINE FOR CUTTING SAME TO LENGTH

CROSS REFERENCE TO RELATED APPLICATION

This application is for entry into the U.S. National Phase under § 371 for International Application No. PCT/EP2015/077471 having an international filing date of Nov. 24, 2015, and from which priority is claimed under all applicable sections of Title 35 of the United States Code including, but not limited to, Sections 120, 363, and 365(c), and which in turn claims priority under 35 USC 119 to German Patent Application No. 10 2014 117 618.9 filed on Dec. 1, 2014.

The invention relates to a method for sawing a long profile in that a sawing disc having teeth arranged around a circular outer circumference of the sawing disc is rotated, the sawing disc is advanced from a freely rotating position to an outer wall of the long profile, and a zero tooth engages as the first of the teeth in the material of the outer wall.

The invention also relates to a machine for cutting sections of a long profile to length with a receptacle for the long profile of a sawing disc with teeth arranged around a circular outer circumference of the sawing disc and an advancing device for the sawing disc in the direction of the receptacle.

Methods for cutting sections of a long profile to length as well as machines used therefor are naturally well known in the prior art in the form of tube cutting machines.

A disadvantage of the said tube cutting machine is that the circular saw blades used, even with a high quality of straightening, are not exactly flat, but have a lateral runout. As the sawing disc rotates in the tube cutting machine, this results in the saw teeth jumping more or less slightly forwards and backwards along the axis of rotation of the sawing disc, and it is arbitrary which tooth is the first tooth to strike the outer wall of the tube. This is disadvantageous in particular because the saw blades can be easily moved laterally, even with a high quality of straightening, and already the first tooth produces a small saw groove in the outer wall of the long profile and thus substantially determines the direction of the saw groove for the further sawing operation. Disadvantageously, a tooth with lateral runout determines a crooked saw groove. Saw blades are not static, but change due to temperature, loading and wear.

DE 10 2006 000 297 A1 discloses a circular saw blade which has diamond bodies around its circumference. Two successive sectors in the circumferential direction are formed in each case with a flat run-out region, wherein the successive flat run-out regions are directed to different sides with respect to a central plane.

DE 43 08 032 C2 discloses a sawing machine, wherein the profiled material is supported in the region between its rear end gripped continuously in the vertical direction and its front region for defined positioning in the advancing plane during the step by step advance of the profiled material under rolling friction is supported in such a way that the step by step advancing movement of the gripped rear end is ensured without hindrance with simultaneous optimal support.

DE 691 03 033 T2 relates to a machine for receiving a continuous piece of material with a carriage unit and a device for movement of the carriage unit to and fro along a predetermined length, a cutting blade and a device which supports the cutting blade on the carrier, wherein a device is provided for moving the cutting blade radially inwards with respect to the axis, whilst the cutting blade rotates about this axis and cuts the said length, so that while the cutting blade cuts this length it moves in a straight line transversely with respect to the said length.

In a first aspect, it is an object of the invention to provide a method for cutting long profile sections to length which enables a cut as vertical as possible to be made into the long profile, and in a second aspect it is an object of the present invention to provide a machine by which a cut as vertical as possible can be introduced into the outer wall of a long profile.

This object is achieved in its first aspect by a method referred to in the introduction with the characterising features of claim 1.

Long profiles are understood to be tubes or full profiles, preferably made from metal or predominantly from metal. In cross-section perpendicular to the longitudinal direction they are preferably circular, but other cross-sections are also conceivable.

According to the invention, during the free rotation of the sawing disc lateral runouts of the teeth are determined, and a tooth with minimal runout, preferably no lateral runout, is determined, and the determined tooth is used as a zero tooth.

The invention makes use of the idea that in the vast majority of cases the sawing disc is bent out of the ideal zero position in both directions. Some saw teeth have a right lateral runout and others have a left lateral runout, i.e. during rotation of the sawing disc there is at least one tooth, and in fact there are at least two teeth, which have a minimal deviation out of the zero position, that is to say a minimal lateral runout, preferably no lateral runout at all. The invention also makes use of the idea of determining the lateral runout of the teeth of the sawing disc during the free rotation just before the actual cutting operation, and to determine the tooth with the minimal lateral runout and to use the determined tooth as a zero tooth, that is to say to engage in the material of the outer wall of the long profile with precisely this one zero tooth as the first tooth during the actual cutting operation. Because the zero tooth has already produced a small saw groove between approximately 0.05 mm and 0.35 mm in the outer wall, due to the flexibility of the sawing disc along the axis of rotation the direction of the saw groove determines the entire direction of the saw groove for the further cutting operation. The invention makes it possible to apply the saw groove almost perpendicular, preferably exactly perpendicular to the longitudinal direction of the long profile. The longitudinal direction of the long profile and the axis of rotation of the sawing disc are preferably arranged parallel to one another.

The long profiles are preferably full profiles or tubes, preferably metal profiles.

Lateral runouts of the teeth are advantageously measured continuously during the free rotation relative to a distance sensor in a fixed position and angular positions of the sawing disc are measured continuously and an angular position profile of the lateral runout is determined from the measured values, and a tooth with minimal lateral runout is determined from the profile. Since the sawing discs usually have right and left lateral runouts, the profile has at least two zero passages. Preferably the angular position of the zero passage of the profile is determined and the zero tooth of the sawing disc belonging to this angular position is determined. The zero tooth is then produced in the outer wall of the long profile as a first tooth.

The method according to the invention presupposes a controlled sawing operation. The position of the sawing disc is preferably determined with the aid of an NC control, such as is known in the prior art, and the sawing disc is likewise advanced under NC control in the direction of the outer wall of the long profile. Both the saw blade drive and also the advancing drive are in each case a NC axis.

The distance sensor is positioned at a constant distance from the axis of rotation of the sawing disc, this distance remaining constant even during the advance, and the distance of the sensor from the ideal zero position of the sawing disc is known and predetermined. For this purpose a zero position of the sawing disc is preferably determined. The advance and the rotation of the sawing disc are preferably controlled in such a way that the tooth with minimal lateral runout becomes the zero tooth.

After the sawing, a tooth with minimal lateral runout is preferably determined and used as the zero tooth before each subsequent sawing of a further long profile. The zero teeth can vary from sawing operation to sawing operation, because the saw blades are not static but can change somewhat from sawing operation to sawing operation due to temperature, loading and wear. In this way an optimal cut is achieved for each sawing operation.

A subsequent zero tooth spaced furthest apart from the zero tooth of the sawing operation is advantageously determined for subsequent sawing. The zero teeth of directly sequential sawing operations differ from one another only slightly by a few teeth or one single tooth or even no tooth. Since as a rule two zero teeth are provided per saw blade, the zero teeth are used alternately, or at least the zero tooth furthest away from the used zero tooth is used for the directly following sawing operation.

The object is achieved in its second aspect by a machine referred to in the introduction with the characterising features of claim 7.

According to the invention, laterally along an axis of rotation alongside the teeth of the sawing disc there is arranged a distance sensor, which is directed towards the teeth of the sawing disc and measures lateral runouts of the teeth during the free rotation of the sawing disc, and an evaluation unit which is connected to the distance sensor and by which the measured values from the distance sensor can be supplied.

The distance sensor is preferably arranged adjustably relative to the axis of rotation, in particular adjustably arranged perpendicular to the axis of rotation. The distance sensor is arranged for a predetermined sawing disc in such a way that it is arranged spaced by more than half the thickness of the sawing disc, and offset laterally in the longitudinal direction, alongside the teeth of the sawing disc which are running past it. The axis of rotation of the sawing disc and a longitudinal direction of the long profile are preferably arranged parallel to one another.

The distance of the distance sensor from the axis of rotation can be adapted to the type of sawing disc.

In a preferred embodiment of the machine according to the invention an angle measuring device for a rotational position of the sawing disc is provided which is connected to the evaluation device and by which a lateral runout angular position profile of the sawing disc can be determined and by which a zero tooth is determined. Therefore the machine according to the invention makes it possible, by provision of the zero points of the lateral runout angular position profile, to determine the angular position without lateral runout and to determine the tooth associated with the angular position which is selected as the zero tooth. For this purpose a control for the rotation and for the advancing of the sawing disc is preferably provided, which makes it possible to select as the zero tooth the first tooth which engages in the material of the outer wall of the long profile.

Advantageously the control makes it possible for a subsequent zero tooth spaced furthest apart from the zero tooth of the sawing operation to be determined for subsequent sawing. By changing the zero teeth the wear thereon is reduced.

All the above-mentioned machines are suitable for carrying out one or more of the aforementioned methods.

Figure 2:
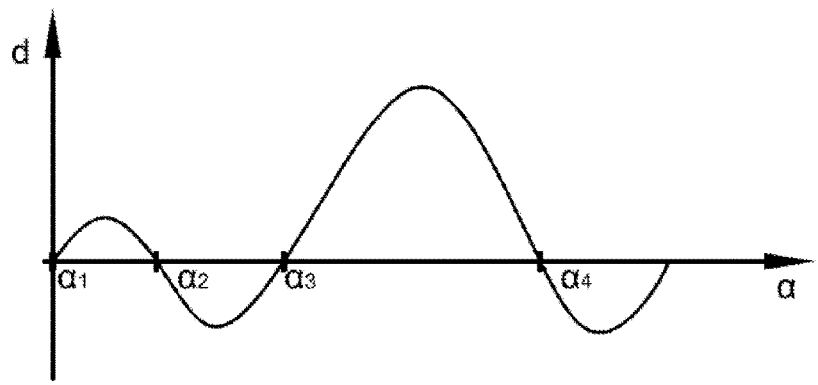
Figure 3:
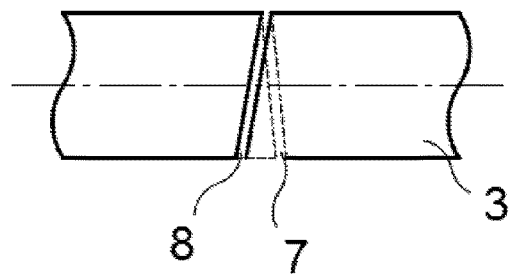

The invention is described with reference to an embodiment with three drawings. In the drawings:

FIG. 1 shows a schematic side view of a sawing disc placed in a receptacle in three different rotational positions with lateral runout, FIG. 2 shows a lateral runout angular position profile of the sawing disc in FIG. 1, FIG. 3 shows a metal tube with different saw grooves.

FIG. 1 shows a side view of a receptacle 1 with a sawing disc 2 which is circular around the circumference. The sawing disc 2 is part of a tube cutting machine which is not described in FIG. 1. In FIG. 1 the sawing disc 2 is positioned remote from the ground above a metal tube 3. The sawing disc 2 is a component of a tube cutting machine which is not described in FIG. 1. The sawing disc 2 is NC controlled. An angular position of the receptacle 1, and thus of the sawing disc 2 clamped non-rotatably relative thereto in the receptacle 1, can be determined by the NC control. Furthermore, the NC control enables the sawing disc 2 to advance by advancing the receptacle 1 in the direction of the metal tube 3 to be cut to length. In this case a direction of advance V is perpendicular to a longitudinal direction L of the metal tube 3 to be cut to length. During the advance, the sawing disc 2 initially rotates freely and without contact with the metal tube 3 and is advanced until the actual cutting operation of the sawing method begins, in which teeth 6 of the sawing disc 2 come into contact with the metal tube 3.

The sawing disc 2 illustrated in FIG. 1 has, like almost all commercially available sawing discs 2, a so-called lateral runout d. The lateral runout d is understood to be a deviation from the ideal flat shape of the sawing disc 2. Even if the sawing disc 2 is correctly gripped in the receptacle 1, it is not oriented exactly perpendicular to the outer wall of the metal tube 3 in every angular position, but, depending upon the angular position $\alpha$ of the sawing disc 2, the tooth 6 coming closest to the outer wall has a lateral runout d, i.e. a deviation from the zero position. The zero position is determined by a perpendicular line which is fixed by the position of the ideal flat sawing disc 2 in the receptacle 1. The zero position of the sawing disc 2 without lateral runout is represented in FIG. 1 by a sawing disc 2 shown by broken lines.

Furthermore, in FIG. 1 two angular positions $\alpha$ of the same sawing disc 2 are represented by sawing discs 2 shown by solid lines. The sawing disc 2 shown by solid lines is characterised by the lateral runout d. In addition to the sawing disc 2, a distance sensor 4 is provided which is advanced in the direction of the axis of rotation of the sawing disc 2. This is an inductive distance sensor 4 which precisely determines the distance of the teeth 6 from the distance sensor 4 in the 0.1 micrometer range. The distance sensor 4 makes it possible to record a measured value every 1.0 milliseconds so that, with 300 rotations per minute, approximately 200 measurement points per rotation of the sawing disc 2 can be taken. The distance sensor 4 is calibrated so that it measures a distance from the ideal zero position of the tooth 6 of the sawing disc 2. Depending upon the control, shorter cycles are also possible.

FIG. 2 shows a basic curve of the lateral runout d as a function of the angular position $\alpha$ of the sawing disc 2 in a full rotation of the sawing disc 2. The profile illustrated in FIG. 2 is produced by interpolation of the recorded measured values. FIG. 2 shows in particular that at four different angular positions $\alpha_1, \alpha_2, \alpha_3, \alpha_4$ no lateral runout d is present, i.e. the teeth 6 which, in these angular positions $\alpha_1, \alpha_2, \alpha_3, \alpha_4$, sweep past the distance sensor 4 have no lateral runout d. The teeth 6 with minimal or absolutely no lateral runout d are designated here as zero teeth $Z_1, Z_2, Z_3, Z_4$. An evaluation device (not shown) makes it possible to control the sawing disc 2 so that during the cutting operation one of the zero teeth $Z_1, Z_2, Z_3, Z_4$ is the first tooth 6 to strike the outer surface of the metal tube 3 and removes some material from the outer surface of the metal tube 3. The advance per tooth 6 in the advancing direction V is approximately 0.05 mm to 0.35 mm. Because the first tooth 6 predetermines the direction of a saw groove 7 in the metal tube 3, it is crucial that this tooth 6 has no lateral runout d, in order to introduce a cut exactly at right angles into the outer wall of the metal tube 3. The sawing discs 2 are easily laterally flexible, so that the direction of the saw groove 7 predetermined by the first tooth 6 determines the overall direction of the saw groove 7.

FIG. 3 shows two possible saw grooves 7, 8 depicted in a metal tube 3. One saw groove 8 is produced in a conventional manner by a sawing disc 2, of which the zero tooth $Z_1, Z_2, Z_3, Z_4$ has a lateral runout d, whereas the second saw groove 7 shown by broken lines has been produced in a cutting operation in which the zero tooth $Z_1, Z_2, Z_3, Z_4$ has no lateral runout d.

LIST OF REFERENCES 1 receptacle
2 sawing disc
3 metal tube
4 distance sensor
6 tooth
7 saw groove
8 saw groove
$\alpha$ angle
$\alpha_1$ angular position
$\alpha_2$ angular position
$\alpha_3$ angular position
$\alpha_4$ angular position
d lateral runout
V advancing direction
L longitudinal direction
$Z_1$ zero tooth
$Z_2$ zero tooth
$Z_3$ zero tooth
$Z_4$ zero tooth

The invention claimed is:

1. Method for sawing a long profile (3) in that a sawing disc (2) having teeth (6) arranged around a circular outer circumference of the sawing disc (2) is rotated freely, the sawing disc (2) is advanced from a freely rotating position to an outer wall of the long profile (3), and a zero tooth ($Z_1, Z_2, Z_3, Z_4$) engages as the first of the teeth (6) in the material of the outer wall, characterised in that during the free rotation of the sawing disc (2), lateral runouts (d) of the teeth (6) are determined, and a tooth (6) having a minimum lateral runout (d) is determined and used as the zero tooth ($Z_1, Z_2, Z_3, Z_4$);

wherein the lateral runouts (d) of the teeth (6) are continuously measured during the rotation relative to a distance sensor (4) in a fixed position and angular positions ($\alpha$) of the saw disc (2) are continuously measured, a lateral runout angular position profile of the sawing disc (2) is determined and a tooth (6) with minimal lateral runout (d) is determined from the lateral runout angular position profile.

2. Method according to claim 1, characterised in that an advance and the rotation of the sawing disc (2) are controlled in such a way that the tooth (6) with minimal lateral runout (d) becomes the zero tooth ($Z_1, Z_2, Z_3, Z_4$).

3. Method according to claim 1, characterised in that a zero position of the sawing disc (2) is determined.

4. Method according to claim 1, characterised in that after the sawing, a tooth (6) with minimal lateral runout (d) is determined and is used as the zero tooth ($Z_1, Z_2, Z_3, Z_4$) before each subsequent sawing of a further long profile.

5. Method according to claim 1, characterised in that a subsequent zero tooth ($Z_1, Z_2, Z_3, Z_4$) spaced furthest apart from the zero tooth ($Z_1, Z_2, Z_3, Z_4$) of the sawing operation is determined for subsequent sawing.

6. Machine for cutting sections of a long profile (3) to length, comprising a receptacle for the long profile (3); a sawing disc (2) with teeth (6) arranged around a circular outer circumference of the sawing disc (2); an advancing direction (V) for the sawing disc (2) in the direction of the receptacle (1), characterised in that, laterally along an axis of rotation alongside the teeth (6) of the sawing disc (2) there is arranged a distance sensor (4), which is directed towards the teeth (6) of the sawing disc (2) and measures lateral runouts (d) of the teeth (6) during the free rotation of the sawing disc (2), and an evaluation unit which is connected to the distance sensor (4) by which measured values from the distance sensor (4) can be supplied to the evaluation unit; and an angle measuring device for a rotational position of the sawing disc (2) which is connected to the evaluation unit and by which a lateral runout angular position profile of the sawing disc (2) can be determined and by which a zero tooth ($Z_1, Z_2, Z_3, Z_4$) can be determined.

7. Machine according to claim 6, characterised by a control for the rotation and the advancing of the sawing disc (2) which makes it possible to select the zero tooth ($Z_1, Z_2, Z_3, Z_4$) as first tooth (6) which engages in the material of the outer wall of the long profile (3).

8. Machine according to claim 6, characterised in that a control makes it possible for a subsequent zero tooth ($Z_1, Z_2, Z_3, Z_4$) spaced furthest apart from the zero tooth ($Z_1, Z_2, Z_3, Z_4$) of the sawing to be determined for subsequent sawing.

* * * * *